US009003225B2

(12) United States Patent
Rafacz et al.

(10) Patent No.: US 9,003,225 B2
(45) Date of Patent: Apr. 7, 2015

(54) CONFIRMING STORE-TO-LOAD FORWARDS

(71) Applicant: Advanced Micro Devices, Inc., Sunnyvale, CA (US)

(72) Inventors: Matthew A. Rafacz, Austin, TX (US); Matthew M. Crum, Austin, TX (US); Michael E. Tuuk, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 234 days.

(21) Appl. No.: 13/653,924

(22) Filed: Oct. 17, 2012

(65) Prior Publication Data

US 2014/0108862 A1 Apr. 17, 2014

(51) Int. Cl.
*G06F 11/00* (2006.01)
*G06F 9/38* (2006.01)
*G06F 11/07* (2006.01)

(52) U.S. Cl.
CPC .......... *G06F 11/0721* (2013.01); *G06F 9/3826* (2013.01); *G06F 9/3834* (2013.01); *G06F 9/3842* (2013.01); *G06F 11/0751* (2013.01)

(58) Field of Classification Search
CPC .................. G06F 9/30043; G06F 11/0721
USPC .................... 714/10; 712/216, 218, 225
See application file for complete search history.

(56) References Cited

U.S. PATENT DOCUMENTS

| 5,751,995 | A | * | 5/1998 | Sarangdhar | 711/145 |
| 6,021,485 | A | * | 2/2000 | Feiste et al. | 712/216 |
| 7,822,951 | B2 | * | 10/2010 | Ramani et al. | 712/218 |
| 2006/0149931 | A1 | * | 7/2006 | Haitham et al. | 712/218 |
| 2010/0199045 | A1 | * | 8/2010 | Bell et al. | 711/137 |
| 2011/0040955 | A1 | * | 2/2011 | Hooker et al. | 712/225 |

* cited by examiner

*Primary Examiner* — Scott Baderman
*Assistant Examiner* — Joseph Kudirka

(57) ABSTRACT

A processor includes a store queue that stores information representing store instructions. In response to retirement of a store instruction, the processor invalidates the corresponding entry in the store queue, thereby indicating that the entry is available to store a subsequent store instruction. The store address is not removed from the queue until the subsequent store instruction is stored. Accordingly, the store address is available for comparison to a dependent load address.

25 Claims, 6 Drawing Sheets

CONFIRMING STORE-TO-LOAD FORWARDS

BACKGROUND

1. Field of the Disclosure

The present disclosure generally relates to store-to-load forwarding for processors.

2. Description of the Related Art

Processors typically enhance processing efficiency by employing out-of-order execution, whereby instructions are executed in an order different from the instructions' program order. In order to avoid errors, a processor executing instructions out of order uses memory disambiguation techniques to account for dependencies between load and store instructions. One such memory disambiguation technique is to delay committing store instructions (e.g. writing store data to the processor cache) until the store instructions are ready to be retired. The store instructions, including their respective store data, are maintained in a store buffer until retirement. Using a technique referred to as store-to-load forwarding, a load instruction that is dependent on a store instruction in the store queue is satisfied by providing the store data from a target register of the store instruction, so that the load instruction does not retrieve incorrect data from the cache.

In some cases, the processor can mistakenly identify a load instruction as dependent on a particular store instruction, resulting in incorrect data being forwarded to the load instruction. A mistaken store-to-load forward typically is addressed by either replaying the load instruction so that it receives correct data or, if the load instruction is past the point in an instruction pipeline where it can be replayed, via a resynchronization, or resync, operation whereby the processor state is synchronized to state data saved prior to the mistake. Such resynchronization operations can have a substantial impact on processor performance. Further, because mistaken store-to-load forwards can cause catastrophic errors if left unaddressed, processors typically take a conservative approach whereby a resync operation is performed if the correctness of a store-to-load forward cannot be verified.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

FIGS. 1-6 illustrate techniques for confirming the correctness of store-to-load forward operations by comparing dependent load instructions to both retired and unretired store instructions. In some embodiments, a processor includes a store queue that stores information representing unretired store instructions. In response to retirement of a store instruction, the processor invalidates the corresponding entry in the store queue, thereby indicating that the entry is available to store a subsequent store instruction. However, the store address is not removed from the store queue until the subsequent store instruction is stored in the store queue. Accordingly, the store address of the retired store instruction is available for comparison to a dependent load address. The length of time that a store operation is available to for store-to-load forwarding confirmation is therefore extended, reducing the number of resynchronizations at the processor.

To illustrate, the processor confirms that a dependent load instruction was forwarded correct data by comparing the load address to the store addresses of older store instructions at the store queue. If an address match is not detected, the processor cannot verify a correct store-to-load forward and therefore either replays the load instruction or, if the load is past a point where it can be replayed, triggers a resync operation. Conventionally, the processor compares the load address only to the store addresses of unretired store instructions. Accordingly, an accurate store-to-load forward can trigger an unnecessary resync operation if the associated store instruction has been retired before the load address of the load instruction has been received. By confirming the store-to-load forward based on both unretired and retired store instructions at the store queue, an accurate store-to-load forward is more likely to be verified.

Figure 1:
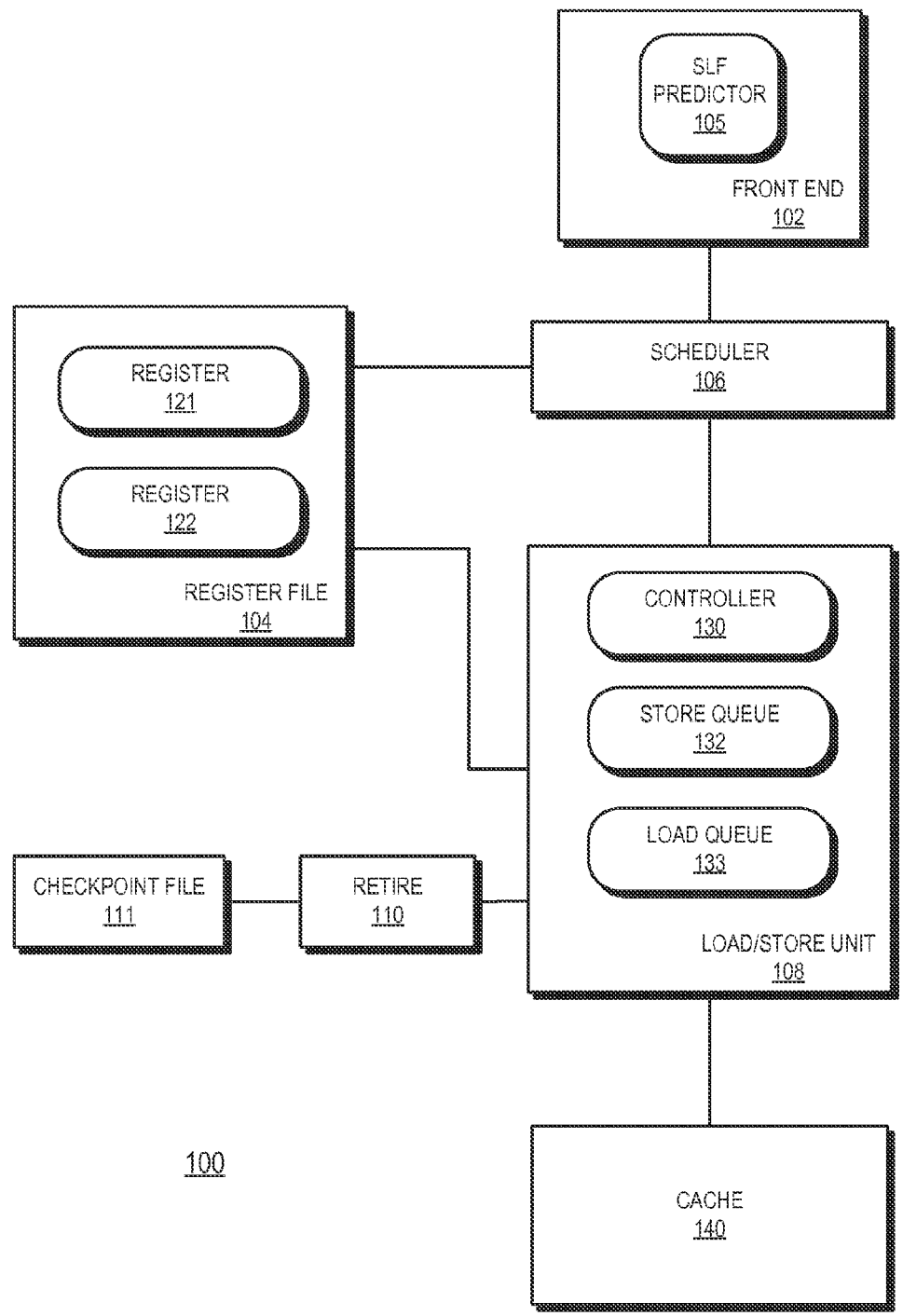
FIG. 1 is a block diagram of an instruction pipeline of a processor in accordance with some embodiments.

FIG. 1 illustrates a block diagram of an instruction pipeline 100 of a processor in accordance with some embodiments. The instruction pipeline 100 executes instructions in order to carry out tasks defined by the instructions. The processor can be incorporated in any of a number of electronic devices, including a personal computer, a server, a cell phone, a video game system, and the like. The instructions executed by the processor are arranged as computer programs, and each of the computer programs sets forth its instructions in a program order. As explained further below, the instruction pipeline 100 is arranged to execute instructions out-of-order with respect to the program order and to manage the out-of-order execution such that the execution results match the results expected if the instructions were executed in order.

In addition, and as described further below, the instruction pipeline 100 is arranged to enhance processing efficiency by performing designated speculative operations. As used herein, a speculative operation refers to performing a task in response to a prediction that the task is to be performed in the course of executing a set of instructions. Examples of speculative operations include branch prediction, whereby the instruction pipeline 100 predicts which program branches will be taken in the program order and executes the instructions of the predicted taken program branches, and store-to-load forwarding (SLF) prediction, whereby the instruction pipeline 100 predicts dependencies between store and load instructions that have not yet been executed and performs store-to-load forward operations based on the predictions. The speculative operations enhance processor efficiency by allowing the operations to be performed while the instruction pipeline 100 makes a final determination as to whether the operation is required by the instructions in process. Thus, for example, SLF prediction allows the instruction pipeline 100 to perform store-to-load forwarding concurrently with making a final determination as to the dependency between load and store instructions.

Because the speculative operations sometimes can be incorrect, in that the operations do not match the tasks actually required by the program order, the instruction pipeline 100 is configured to confirm the correctness of the speculative operations and remediate any incorrect operations. For example, for each store-to-load forward operation, the instruction pipeline 100 is configured to determine whether the operation is correct by determining whether the data forwarded by the store-to-load forward operation is the data that would have been retrieved by the corresponding load operation if the instructions were executed in the program order. This determination as to the correctness of a store-to-load forward operation is referred to herein as "confirming" the store-to-load forward operation and can result in either verifying the store-to-load forward operation or determining the store-to-load forward operation was erroneous. If confirming the store-to-load forward operation indicates that the correct data was forwarded to the associated load instruction, the store-to-load forward operation is referred to as "verified".

In the example depicted at FIG. 1, the instruction pipeline 100 includes a front end 102, a register file 104, a scheduler 106, a load/store unit 108, a retire stage 110, a checkpoint file 111, and a cache 140. The front end 102 includes a number of stages of the instruction pipeline 100, including a fetch stage, a decode stage, and a dispatch stage. Accordingly, the front end 102 is configured to retrieve instructions from a cache or from memory (not shown) according to the program order, decode the retrieved instructions, and dispatch the decoded instructions to one or more execution units, such as a floating point unit (not shown) and the load/store unit 108.

The front end 102 also can provide speculative information to facilitate the execution of speculative operations at subsequent stages of the instruction pipeline 100. For example, the front end 102 includes an SLF predictor 105 that predicts dependencies between load and store instructions. As used herein, instruction B is dependent on instruction A if an operand of instruction B is modified by the execution of instruction A and instruction A is prior to instruction B in the program order. To illustrate, a load instruction is dependent on a store instruction if the store instruction is prior to the load instruction in the program order and the address of the store instruction (the "store address") matches the address of the load instruction (the "load address"). In some embodiments, the SLF predictor 105 determines dependencies between load and store instructions based on a partial decoding of the store and load addresses. The partial decode is a speculative operation because its results may vary from the full decoding of the addresses. For example, the partial decode may decode only higher order bits in an address, and assume the value of lower order bits. The full decode of the address may indicate that the assumption of the value of the lower order bits was incorrect. In some embodiments, the SLF predictor 105 determines dependencies based on detected patterns in the instructions being executed.

The register file 104 includes a set of registers, including registers 121 and 122, that are used to support execution of instructions. To illustrate, each load or store instruction includes an operand identifying a corresponding one of the registers of the register file 104 as the target of the instruction. This corresponding register is referred to herein as the target register of the instruction. The target register of a load instruction is the register identified by the instruction to which data is to be loaded. A load instruction therefore instructs the instruction pipeline 100 to ensure that the data stored at the load address (the "load data") is placed at the load instruction's target register. The target register of a store instruction is the register where the data is to be stored. Thus, a store instruction instructs the instruction pipeline 100 to ensure that the data at the target register (the "store data") is stored to the memory location corresponding to the store address.

The scheduler 106 is configured to receive instructions from the front end 102 and schedule the instructions for execution at the execution units of the instruction pipeline 100. In some embodiments, the scheduler 106 determines dependencies between received instructions and schedules the execution of the instructions so that dependent instructions are executed after the instructions upon which they depend. Further, the scheduler 106 can schedule instructions that are independent of each other out of program order, according to the availability of each of the execution units.

In addition, the scheduler 106 receives prediction information from the front end 102 predicting the dependency of load instructions on corresponding store instructions. Based on the prediction information, the scheduler 106 forwards store data to the load instructions by copying the corresponding data at the register file 104 to the target registers of the load instructions. To illustrate by way of example, the scheduler 106 can receive information indicating that a particular load instruction, designated "Load1", is predicted to be dependent on a store instruction, designated "Store1" that has been received at the scheduler 106. For purposes of this example, the target register of the Load1 instruction is register 121 and the target register of the Store1 instruction is register 122. In response to receiving the prediction information, the scheduler 106 determines the target registers for the Store1 and Load1 instructions and sends control information to transfer the data at register 122 to register 121. In some embodiments, the data is transferred by copying the data at register 122 to register 121. In some embodiments, data can be transferred via register renaming, whereby the physical register assigned to the target register of the Load1 instruction is changed to the physical register assigned to the target register of the Store1 instruction. By transferring the data, the scheduler 106 forwards the store data for the Store1 instruction to the Load1 instruction.

The load/store unit 108 is an execution unit that executes load and store instructions received from the scheduler 106. The load/store unit 108 is connected to the cache 140. To execute a load instruction, the load/store unit 108 calculates the load address based on the load instruction. If the load instruction has not been subject to a store-to-load forward, the load/store unit 108 provides the load address to the cache 140, which retrieves the load data either from its internal storage array or fetches the load data from external memory (not shown). The cache 140 provides the retrieved load data to the load/store unit 108, which stores the load data at the load instruction's target register at the register file 104. For a received store instruction, the load/store unit 108 calculates the store address based on the store instruction, retrieves the store data from the store instruction's target register at the register file 104, and provides the retrieved store data to the cache 140 for storage.

The load/store unit 108 includes a controller 130, a store queue 132, and a load queue 133. The store queue 132 and load queue 133 respectively store the store and load instructions that are awaiting completion. The controller 130 manages the operations of the load/store unit 108. Accordingly, the controller 130 manages storage of load and store instructions at the load queue 133 and store queue 132 respectively, controls communications with the cache 140 and the register file 104, and performs other management functions. In some embodiments, the controller 130 confirms store-to-load forward operations. To illustrate, the controller 130 receives information from the scheduler 106 indicating which load instructions were the subject of a store-to-load forward (referred to herein as "target loads"), and for which store instructions data was forwarded (referred to herein as "forwarded stores"). As described further below with respect to FIGS. 2-4, the controller 130 compares the load address for a target load to the store address for its corresponding forwarded store. The controller 130 also compares the load address for a target load to the store address for each store instruction between the target load and its corresponding forwarded store in the program order. The controller 130 indicates a store-to-load forward error in response to detecting either 1) that the load address of a target load does not match the store address of its corresponding forwarded store; 2) that the load address of the target load matches the store address of a store instruction between the target load and its corresponding forwarded store in the program order; or 3) that the store queue 132 does not store a corresponding forwarded store for the target load. If neither of these conditions is detected, the controller 130 indicates the store-to-load forward associated with the target load is correct. As described further below with respect to FIGS. 2-4, the controller 130 can confirm the store-to-load forward for a target load based on store instructions that are awaiting retirement, and based on store instructions that have completed by committing their data to the cache 140 and have been retired, but that have not been replaced at the store queue 132. This increases the chance that a correct store-to-load forward will be confirmed as correct.

The retire stage 110 manages retirement of instructions at the instruction pipeline 100. For store instructions, the retire stage 110 reports the instruction as retired in response to confirming that the store data has been stored at the cache 140. For load instructions, the retire stage 110 reports the instruction as retired in response to confirming that the load data has been provided to the load instruction's target register, either because a corresponding store-to-load forward has been verified, or because the load data has been retrieved from the cache 140 and stored at the target register.

In some embodiments, the retire stage 110 checks the correctness of speculative operations at the instruction pipeline 100 and, in response to determining a speculative operation is incorrect, or that its correctness cannot be verified, and in response to determining instructions cannot be replayed to correct the incorrect speculative operation, resyncs the instruction pipeline 100 to a previously saved stage prior to the inaccurate speculative operation. To illustrate, the state of the instruction pipeline 100 can be saved to the checkpoint file 111 periodically according to a fixed schedule or in response to defined events, such as a speculative branch prediction at the front end 102, and in response to determining a speculative operation error, such as a mispredicted branch or that the correctness of a store-to-load forward cannot be verified and the corresponding load instruction cannot be replayed, the retire stage 110 conducts a resync operation for the instruction pipeline 100 based on state information at the checkpoint file 111. In particular, to conduct a resync operation, the instruction pipeline, the retire stage copies the state information to corresponding registers of the register file 104 and to internal registers at the stages of the instruction pipeline 100. In some embodiments, the retire stage 110 also flushes instructions from the instruction pipeline 100 that resulted from a speculative operation error.

During a resync operation by the retire stage 110, processing at other stages of the instruction pipeline 100 is stalled, thus reducing processor efficiency. Because the load/store unit 108 confirms store-to-load forward operations based on both unretired store instructions and based on retired store instructions that have not been replaced at the store queue 132, the likelihood that a correct store-to-load forward operation can be verified is increased. Accordingly, the number of unnecessary resync operations or replays of the load instruction is reduced, thereby improving processor efficiency.

Figure 2:
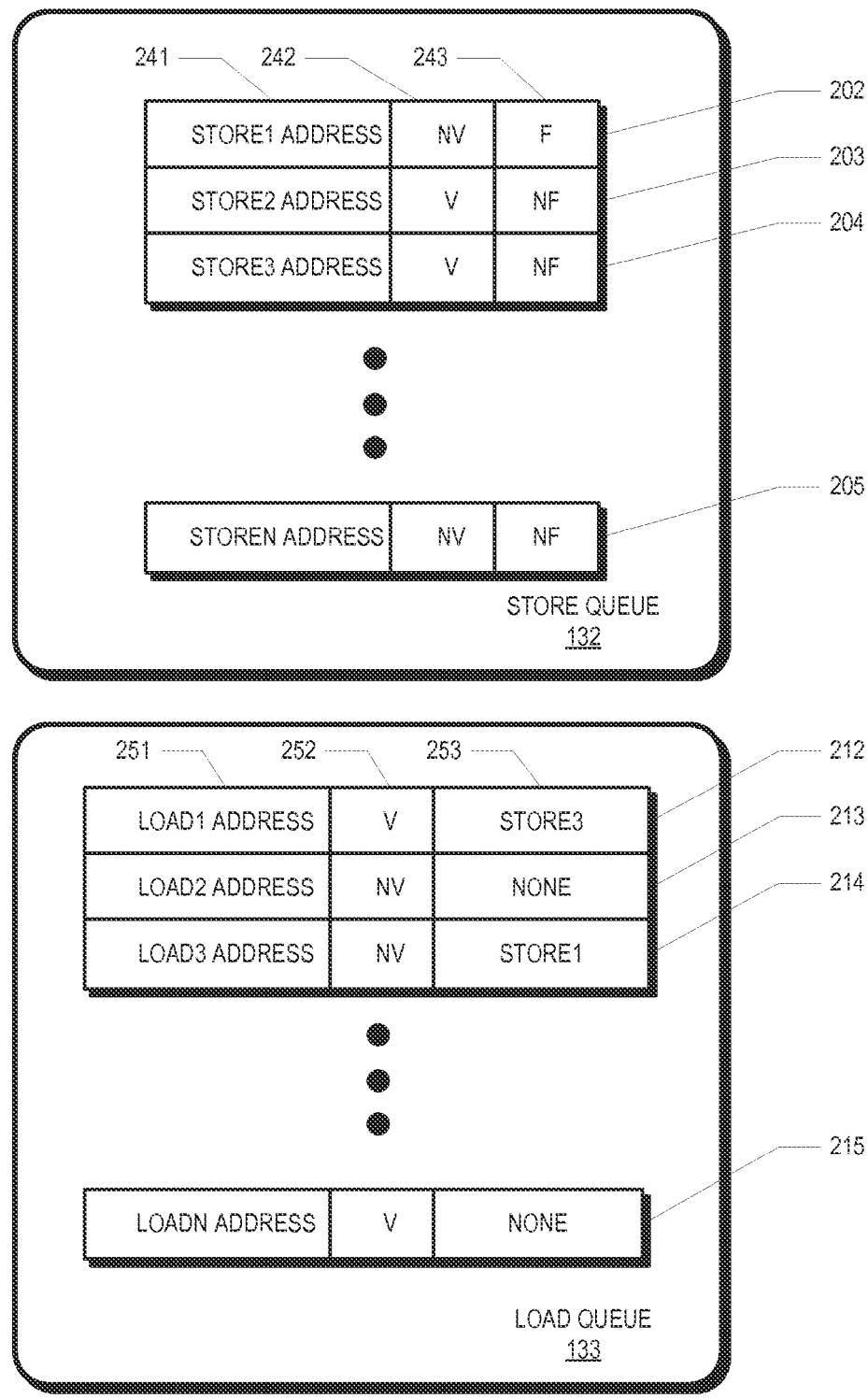
FIG. 2 is a block diagram of load and store queues of FIG. 1 in accordance with some embodiments.

FIG. 2 illustrates the store queue 132 and the load queue 133 of FIG. 1 in accordance with some embodiments. The store queue 132 includes N entries, identified as entries 202-205, whereby each entry stores information for a different store instruction. Each of the entries 202-205 includes a set of fields 241-243. The address field 241 stores address information for the corresponding store instruction, the validity field 242 indicates whether the corresponding store instruction has been retired, and the flush field 243 indicates whether the corresponding store instruction has been flushed from the instruction pipeline 100. In the illustrated embodiments, the state "NV" indicates an instruction has been retired, the state "V" indicates that the instruction has not been retired, the state "F" indicates an instruction has been flushed and the state "NF" indicates that the instruction has not been flushed. In some embodiments, a store instruction is retired when the store data of the store instruction is committed to the cache 140. In some embodiments a store instruction is flushed in response to determining the store instruction was speculatively executed as part of a mispredicted branch at the instruction pipeline.

The load queue 133 includes N entries, identified as entries 212-215, whereby each entry stores information for a different load instruction. Each of the entries 212-215 includes a set of fields 251-253. The address field 251 stores address information for the corresponding store instruction, the validity field 252 indicates whether the corresponding store instruction has been retired. In the illustrated embodiments, the state "NV" indicates an instruction has been retired, the state "V" indicates that the instruction has not been retired. The forwarded field 253 indicates whether the corresponding load instruction was the target load for a store-to-load forward operation. Thus, for example, the forwarded field for entry 212 indicates that the load instruction Load1 was the target load for a store-to-load forward operation that forwarded the store data for the store instruction Store3.

The controller 130 (FIG. 1) stores information for received load and store instructions at corresponding entries of their respective queues such that the information is stored according to the program order of the corresponding load and store instructions. Instructions that are earlier in a program order are referred to as "older" instructions than subsequent instructions in the program order and programs that are later in a program order are referred to as "younger" instructions than preceding instructions in the program order. In the illustrated embodiments, entries closer to entry 202 represent older instructions and entries closer to entry 205 represent younger instructions. It will be appreciated that the entries 202-205 are logical representations of physical entries at the store queue 132. The controller 130 maintains pointers to indicate the physical entry that corresponds to each of the entries 202-205. As instruction information is stored at or replaced at the store queue 132, the controller 130 can change the values of the pointers to the entries to ensure that entry 202 always represents the oldest of the store instructions at store queue 132 and entry 205 always represents the youngest. The load queue 133 is configured in a similar fashion.

In some embodiments, the pointer values for the entries 202-205 and 212-215 are generated such that they reflect the relative placement of the instruction stored at the entry in the program order. The controller 130 can therefore use the pointer values to determine the relative order between a store instruction stored at an entry of the store queue 132 and a load instruction stored at an entry of the load queue 133. This allows the controller to, for example, determine whether there are any intervening store instructions between a target load of a store-to-load forward operation and its corresponding forwarded store.

The controller 130 uses the valid field of each entry to determine whether the entry is available to store information for a received store instruction. To illustrate, in response to receiving a store instruction the controller 130 proceeds through the entries 202-205 in order and determines the first entry having a valid bit in the NV state (an "invalid entry"). The controller 130 then determines whether there are any entries later in the queue order having valid bits in the V state (a "valid entry") and that occur later than the received instruction in the program order. If so, the controller 130 proceeds to the next invalid entry. If not, the controller 130 stores the address for the store instruction at the entry. The controller 130 stores information for load instructions in a similar fashion. Accordingly, the order of store instructions and load instructions in their respective queues reflects the order of the instructions in the program order with respect to other instructions in the queue.

Figure 3:
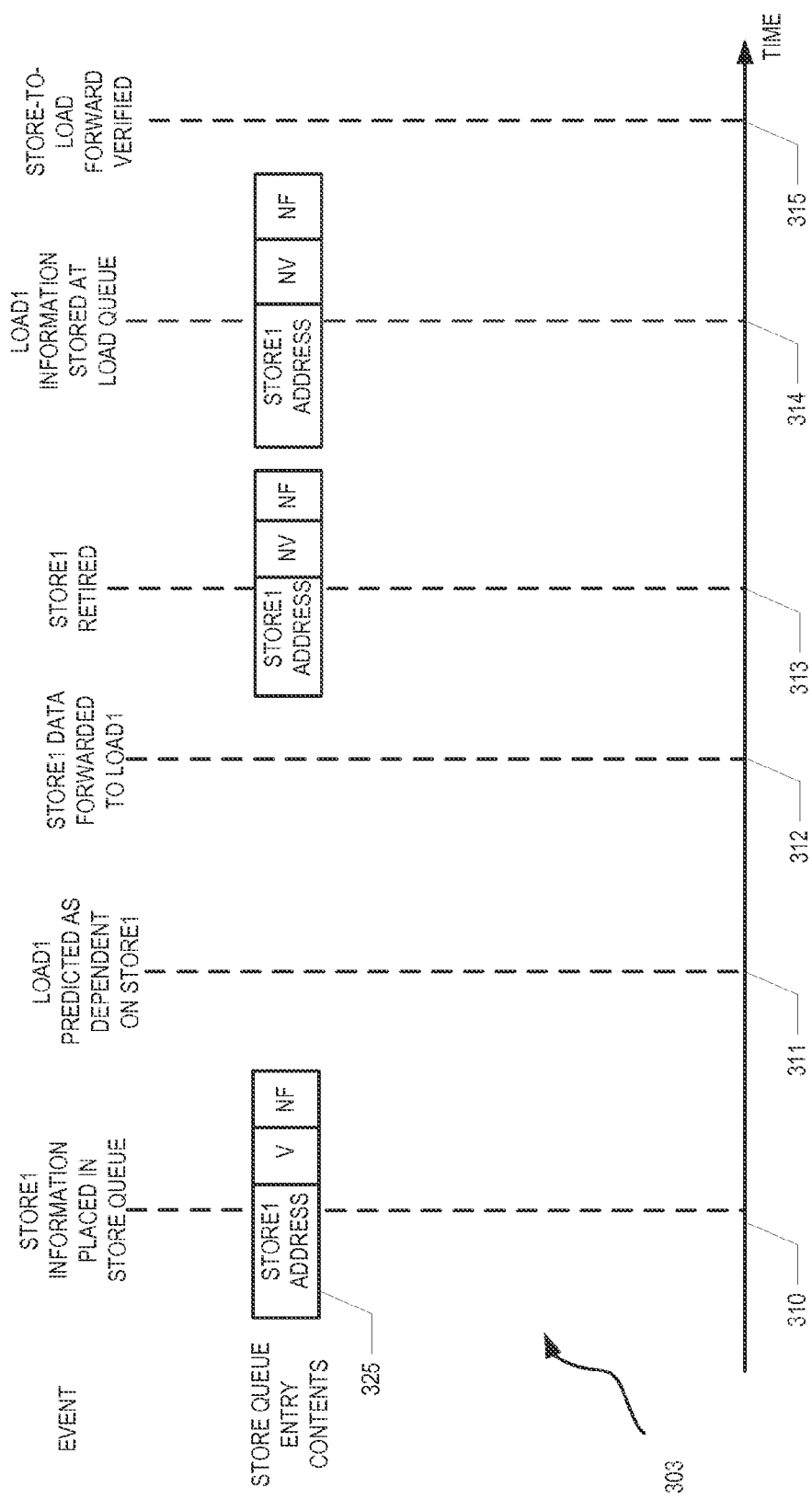
FIG. 3 is a diagram illustrating an example operation of a load/store unit of FIG. 1 to confirm a store-to-load forward in accordance with some embodiments.

FIG. 3 illustrates an example operation of the load/store unit 108 to confirm a store-to-load forward using the store queue 132 and load queue 133 of FIG. 2 in accordance with some embodiments. The illustrated example of FIG. 3 is based on a program order wherein a store instruction designated "Store1" precedes a load instruction designated "Load1". For purposes of the example of FIG. 3, it is assumed that the Load1 instruction is dependent on the Store1 instruction.

FIG. 3 illustrates a timeline 303 showing a sequence of events at the instruction pipeline 100 in the processing of the Load1 and Store1 instructions. The timeline 303 also illustrates, the contents of an entry 325 (corresponding to one of the entries 202-205 of FIG. 2) at the store queue 132 that stores information representing the Store1 instruction. The timeline 303 depicts that at time 310 the Store1 information is placed in the store queue 132. Accordingly, the address field of the entry 325 is set to the store address for the Store1 instruction. In addition, because the Store1 instruction has not yet been retired or flushed, the valid fields and flush fields are set to the V1 and F1 states, respectively. The entry 325 is therefore not eligible to be replaced by a subsequently received store instruction.

At time 311 the SLF predictor 115 predicts that Load1 is dependent on Store1. In response, at time 312 the scheduler 106 forwards the store data for Store1 to Load1. Because Store1 has not yet been retired or flushed, no change is made to the store queue entry for Store1. Between time 312 and 313 the load/store unit 108 determines that the store data for Store1 has been committed to the cache 140. In response, at time 313, the retire stage 110 retires the Store1 instruction. In response to the retirement, the controller 130 sets the state of the validity field at the entry 325 to "NV", indicating that the entry 325 is available to store a subsequently received store instruction. However, the address field of the entry 325 is not cleared. Accordingly, until information representing a subsequently received store instruction is stored at the entry 325, the address information at the address field remains available to confirm the store-to-load forward operation that took place at time 311.

At time 314 the information representing the Load1 instruction is stored at the load queue 133. In response, the controller 130 determines that the Load1 instruction was the target load and that the Store1 instruction was the forwarded store for the store-to-load forward operation that took place at time 311. Accordingly, the controller 130 compares the load address of the Load1 instruction to the Store1 address of the previously retired Store11 instruction, as stored at entry 325. In response to determining the addresses match, the controller 130 compares the load address to the store addresses for any store instructions between Store1 and Load1 in the program order. If the load address matches such a store instruction, it indicates that the store data was incorrectly forwarded from the Store1 instruction to the Load1 instruction. That is, an intervening store instruction indicates that data should have been forwarded from the intervening instruction to the Load1 instruction, rather than from the Store1 instruction to the Load1 instruction. It is assumed for the purposes of the example of FIG. 3 that the load address does not match the address of any such intervening store instructions. Therefore, at time 315 the controller 130 indicates to the retire stage 110 that the store-to-load forward operation at time 311 is verified. The retire stage 110 therefore does not perform a resync operation or replay the load instruction based on the store-to-load forward operation. It will be appreciated that in a conventional system that does not use retired store instructions to confirm store-to-load forward operations, the example of FIG. 3 would trigger a resync operation or replay of the load instruction, thereby reducing processing efficiency.

Figure 4:
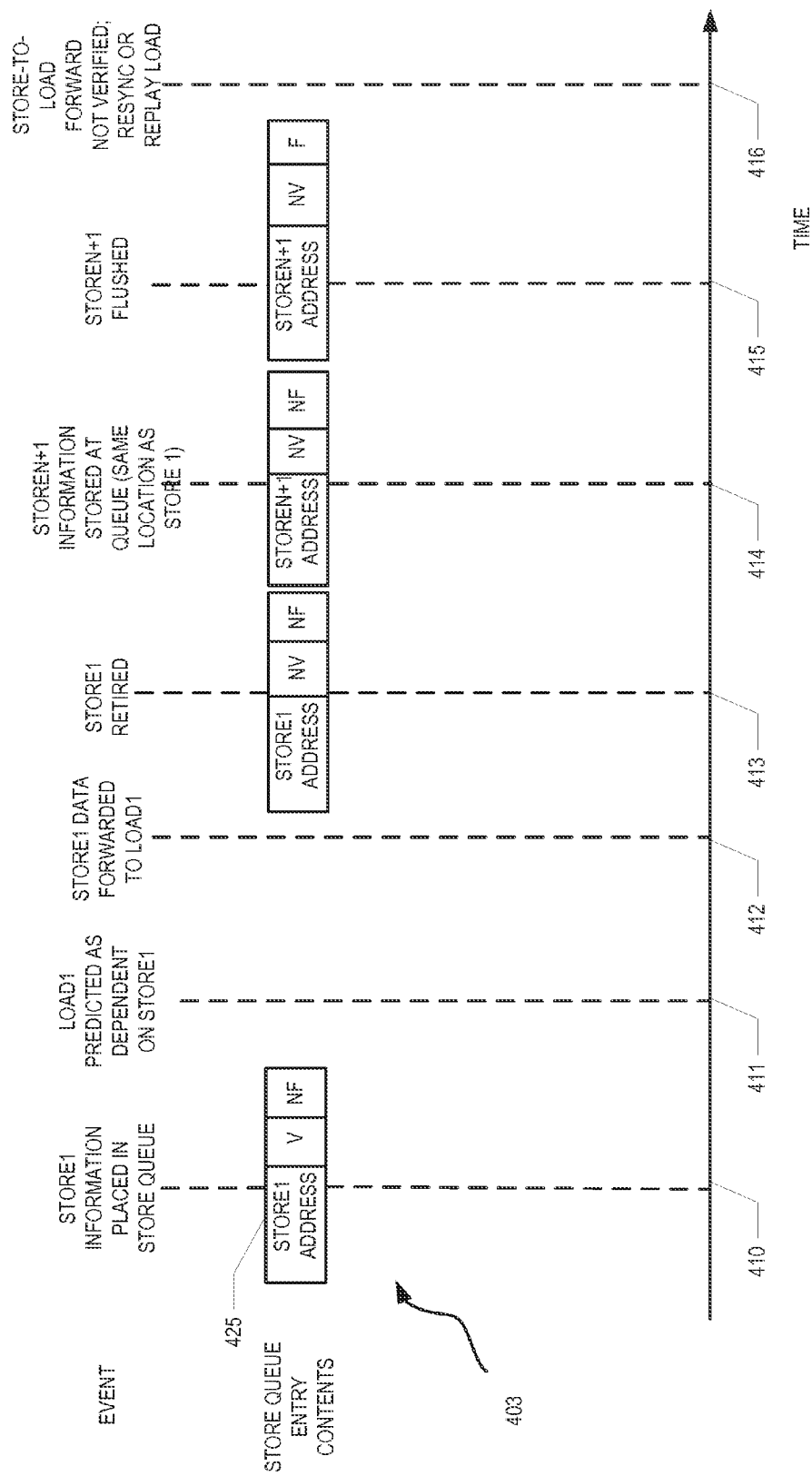
FIG. 4 is a diagram illustrating another example operation of the load/store unit of FIG. 1 to confirm a store-to-load forward in accordance with some embodiments.

FIG. 4 illustrates an example operation of the load/store unit 108 to confirm a store-to-load forward using the store queue 132 and load queue 133 of FIG. 2 in accordance with some embodiments. In the illustrated example of FIG. 4, the flush field of the store queue entry is used to prevent an erroneous store-to-load forward from being verified. The illustrated example of FIG. 4 is based on a program order wherein a store instruction designated "Store1" is included in a program branch that precedes a load instruction designated "Load1". Further, the program order includes an instruction designated "StoreN+" wherein Store1 and StoreN+1 each have a target address that matches the target address of Load1. The StoreN+1 instruction is in a branch that, for purposes of discussion, is assumed to have been mispredicted as being taken.

FIG. 4 illustrates a timeline 403 showing a sequence of events at the instruction pipeline 100 in the processing of the Load1 and Store1 instructions. The timeline 403 also illustrates, the contents of the entry 425 (corresponding to one of the entries 202-205 of FIG. 2) at the store queue 132 that stores the information representing the Store1 instruction. At time 410 the Store1 instruction is placed in the store queue 132 and the address field of the entry 425 is set to the store address for the Store1 instruction. In addition, because the Store1 instruction has not yet been retired or flushed, the valid fields and flush fields are set to the V and NF states, respectively.

At time 411 the SLF predictor 115 predicts that Load1 is dependent on Store1. In the example of FIG. 4, it is assumed that the prediction is incorrect and that forwarding of data from Store1 to Load1 will result in an error. In response to the prediction, at time 412 the scheduler 106 forwards the store data for Store1 to Load1. Because Store1 has not yet been retired or flushed, no change is made to the store queue entry for Store1. Between time 412 and 413 the load/store unit 108 determines that the store data for Store1 has been committed to the cache 140. In response, at time 413, the retire stage 110 retires the Store1 instruction. In response to the retirement, the controller 130 sets the state of the validity field at the entry 425 to the NV state At time 414 the StoreN+1 instruction information is stored at the entry 425. At time 415 the retire stage 110 determines that the branch that led to execution of the StoreN+1 instruction was a mispredicted branch, and therefore indicates that the StoreN+1 instruction is to be flushed. In response, the controller 130 sets the flush field of the entry 425 to the state F and the valid bit to NV. At time 415 the Load1 instruction is stored at the load queue 133. It is assumed that the Load1 instruction was not stored earlier due to delays at the instruction pipeline. In response to storage of the Load1 instruction, the controller 130 determines that the Load1 instruction was the target load and, because the StoreN+1 instruction information is stored at the same entry that the Store1 instruction was stored (entry 425), the controller 130 erroneously assumes that the StoreN+1 instruction is the forwarded for the store-to-load forward operation that took place at time 411. Further, because the StoreN+1 store address matches the load address for Load1, a comparison of the addresses could result in an erroneous verification of the store-to-load forward. However, because the flush field at entry 425 is in the F state, the controller 130 does not compare the load address of the Load1 instruction to the address at entry 425 and therefore does not find an address match for Load1. Accordingly, at time 416 the controller 130 indicates to the retire stage 110 that the store-to-load forward that took place at time 412 cannot be verified. In response, the retire stage 110 either replays the Load1 instruction or, if the Load1 instruction is past a point where a replay can be successfully executed, resyncs the instruction pipeline 100 to a state prior to the store-to-load forward.

Figure 5:
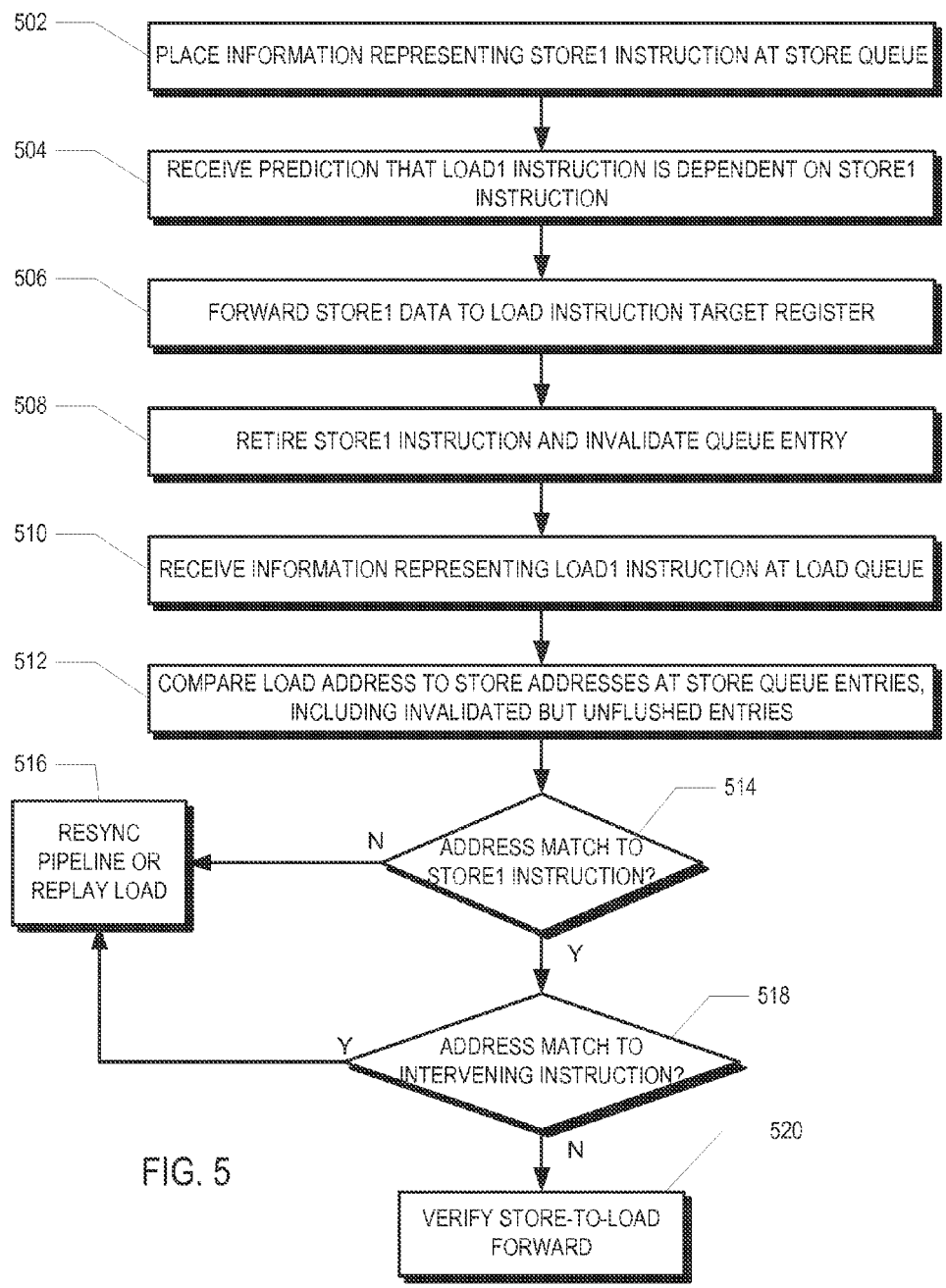
FIG. 5 is a flow diagram illustrating a method of confirming a store-to-load forward in accordance with some embodiments.

FIG. 5 is a flow diagram of a method of confirming a store-to-load forward at the load/store unit 108 of FIG. 1 in accordance with some embodiments. At block 502, controller 130 places information representing a store instruction, designated "Store1", at an entry of the store queue 132. At block 504, the scheduler 106 receives a prediction from the SLF predictor 115 that a load instruction, designated "Load1", is dependent on the Store1 instruction. In response, at block 504 the scheduler 106 forwards the store data for the Store1 instruction to the target register for the Load1 instruction. At block 508 the retire stage 110 retires the Store1 instruction and in response the controller 130 invalidates the entry at the store queue 132 for the Store1 instruction, but maintains the address information stored at the entry.

At block 510 the load/store unit 108 receives information representing the Load1 instruction and stores it at an entry of the load queue 133. The controller 130 determines that the Load1 instruction was subject to a store-to-load forward operation. In response, at block 512 the controller 130 confirms the store-to-load forward operation by comparing the Load1 address to store addresses at the store queue 132, including to store addresses for entries that have been invalidated but not flushed such as the entry for the Store1 instruction. At block 514 the controller 130 determines if there is an address match between the Load1 instruction and the Store1 instruction. If not, this indicates that the store-to-load forward was based on an erroneous prediction. Accordingly, the method flow moves to block 516 and the controller 130 indicates the error to the retire stage 110, which either replays the Load1 instruction or, if the Load1 instruction has already been retired or is otherwise past the point where it can be replayed, resyncs the instruction pipeline 100 in response.

If, at block 514, the controller 130 determines there is an address match between the Load1 and Store1 instructions, the method flow proceeds to block 518 and the controller 130 determines whether there is an address match between the Load1 instruction and any store instructions at the store queue 132 that are between the Load1 and Store1 instructions in the program order. If block 518 results in an address match, the store-to-load forward was based on an erroneous store-to-load forwarding prediction and the method flow moves to block 516. If block 518 does not result in an address match, the method flow moves to block 520 and the store-to-load forward is verified.

In some embodiments, at least some of the functionality described above may be implemented by one or more processors executing one or more software programs tangibly stored at a computer readable medium, and whereby the one or more software programs comprise instructions that, when executed, manipulate the one or more processor cores to perform one or more of the functions described above. Further, in some embodiments, serial data interfaces described above are implemented with one or more integrated circuit (IC) devices (also referred to as integrated circuit chips). Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any storage medium, or combination of storage media, accessible by a computer system during use to provide instructions and/or data to the computer system. Such storage media can include, but are not limited to, optical media (e.g., compact disc (CD), digital versatile disc (DVD), or Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Figure 6:
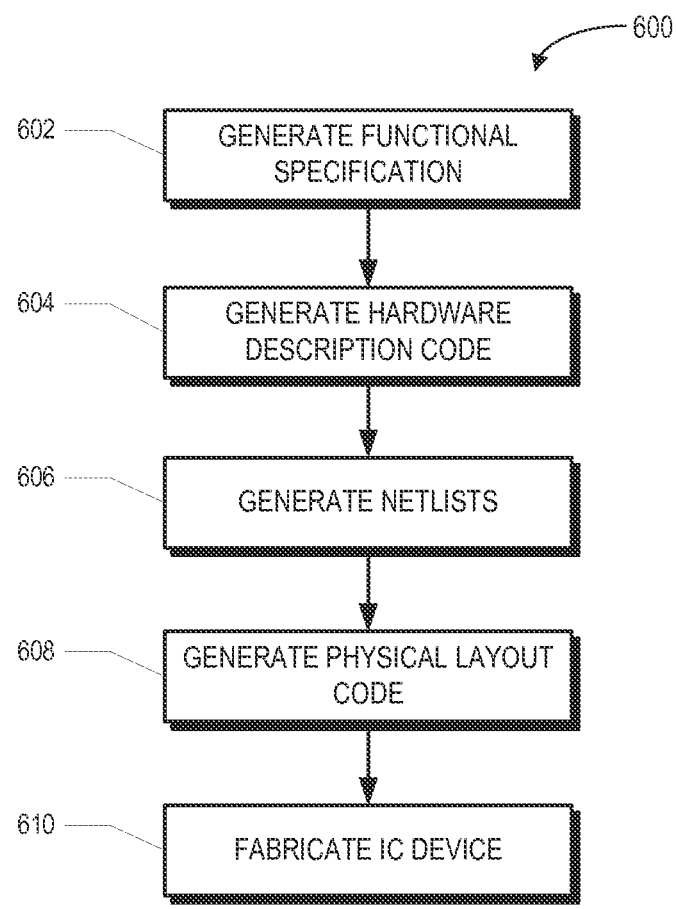
FIG. 6 is a flow diagram illustrating a method for designing and fabricating an integrated circuit device implementing at least a portion of a component of a processing system in accordance with some embodiments.

FIG. 6 is a flow diagram illustrating an example method 600 for the design and fabrication of an IC device implementing one or more of the disclosed embodiments. As noted above, the code generated for each of the following processes is stored or otherwise embodied in computer readable storage media for access and use by the corresponding design tool or fabrication tool.

At block 602 a functional specification for the IC device is generated. The functional specification (often referred to as a micro architecture specification (MAS)) may be represented by any of a variety of programming languages or modeling languages, including C, C++, SystemC, Simulink, or MATLAB.

At block 604, the functional specification is used to generate hardware description code representative of the hardware of the IC device. In some embodiments, the hardware description code is represented using at least one Hardware Description Language (HDL), which comprises any of a variety of computer languages, specification languages, or modeling languages for the formal description and design of the circuits of the IC device. The generated HDL code typically represents the operation of the circuits of the IC device, the design and organization of the circuits, and tests to verify correct operation of the IC device through simulation. Examples of HDL include Analog HDL (AHDL), Verilog HDL, System Verilog HDL, and VHDL. For IC devices implementing synchronized digital circuits, the hardware descriptor code may include register transfer level (RTL) code to provide an abstract representation of the operations of the synchronous digital circuits. For other types of circuitry, the hardware descriptor code may include behavior-level code to provide an abstract representation of the circuitry's operation. The HDL model represented by the hardware description code typically is subjected to one or more rounds of simulation and debugging to pass design verification.

After verifying the design represented by the hardware description code, at block 606 a synthesis tool is used to synthesize the hardware description code to generate code representing or defining an initial physical implementation of the circuitry of the IC device. In some embodiments, the synthesis tool generates one or more netlists comprising circuit device instances (e.g., gates, transistors, resistors, capacitors, inductors, diodes, etc.) and the nets, or connections, between the circuit device instances. Alternatively, all or a portion of a netlist can be generated manually without the use of a synthesis tool. As with the hardware description code, the netlists may be subjected to one or more test and verification processes before a final set of one or more netlists is generated.

Alternatively, a schematic editor tool can be used to draft a schematic of circuitry of the IC device and a schematic capture tool then may be used to capture the resulting circuit diagram and to generate one or more netlists (stored on a computer readable media) representing the components and connectivity of the circuit diagram. The captured circuit diagram may then be subjected to one or more rounds of simulation for testing and verification.

At block 608, one or more EDA tools use the netlists produced at block 906 to generate code representing the physical layout of the circuitry of the IC device. This process can include, for example, a placement tool using the netlists to determine or fix the location of each element of the circuitry of the IC device. Further, a routing tool builds on the placement process to add and route the wires needed to connect the circuit elements in accordance with the netlist(s). The resulting code represents a three-dimensional model of the IC device. The code may be represented in a database file format, such as, for example, the Graphic Database System II (GDSII) format. Data in this format typically represents geometric shapes, text labels, and other information about the circuit layout in hierarchical form.

At block 610, the physical layout code (e.g., GDSII code) is provided to a manufacturing facility, which uses the physical layout code to configure or otherwise adapt fabrication tools of the manufacturing facility (e.g., through mask works) to fabricate the IC device. That is, the physical layout code may be programmed into one or more computer systems, which may then control, in whole or part, the operation of the tools of the manufacturing facility or the manufacturing operations performed therein.

As disclosed herein, in some embodiments a method to determine at a processor if a store-to-load forward operation has provided correct data to a load instruction, includes storing first information representing a first store instruction at a queue; continuing to maintain the first information at the queue after the first store instruction has retired; and confirming, after the first store instruction has retired, the store-to-load forward based on the first information stored at the queue. In some aspects, the method includes storing second information representing a second store instruction at the queue; and confirming the store-to-load forward operation includes confirming the store-to-load forward operation based on the second information while the second information indicates the second store instruction is not retired. In some aspects, confirming the store-to-load forward operation includes verifying the store-to-load forward operation in response to determining a load address of the load instruction matches a first store address of the first store instruction stored at the queue. In some aspects, confirming the store-to-load forward operation includes verifying the store-to-load forward operation in response to determining a load address of the load instruction matches a second store address of the second store instruction store at the queue.

In some aspects, the method includes indicating the first information is invalid in response to retiring the first store instruction; and confirming the store-to-load forward operation includes confirming the store-to-load forward operation after the first information is indicated as invalid. In some aspects, the method includes replacing the first information at the queue with information representing a second store instruction in response to determining the first information is indicated as invalid. In some aspects, the method includes performing the store-to-load forward operation in response to a prediction that the load instruction is a dependent load instruction. In some aspects, confirming the store-to-load forward operation includes determining that data of the first store instruction was forwarded to the load instruction; determining that a first address of the first store instruction matches a load address of the load instruction; determining that a second address of a second store instruction matches the load address; and determining that the store-to-load forward operation was incorrect in response to determining that the second store instruction is between the first store instruction and the load instruction in a program order. In some aspects, the method includes resyncing an instruction pipeline in response to determining the store-to-load forward operation was incorrect.

In some embodiments, a method of determining an error at a processor based on forwarding data from a first store instruction to a load instruction includes determining the error by comparing an address of the load instruction to a plurality of store addresses stored at a corresponding plurality of store queue entries of a store queue, a first entry of the plurality of store queue entries indicated as storing invalid data. In some aspects, the method includes indicating the first entry stores invalid data in response to retiring a second store instruction associated with the first entry. In some aspects, the method includes replacing data at the first entry of the plurality of store queue entries with data associated with a second store instruction in response to determining the first entry is indicated as invalid.

In some embodiments, a processor includes a retire stage to retire store instructions from an instruction pipeline; a plurality of registers including a first register and a second register; a scheduler to perform a store-to-load forward operation by transferring data at the first register to the second register; and a load/store unit to determine if an error occurred in the store-to-load forward operation based on a retired first store instruction. In some aspects the load/store unit is to determine if an error occurred in the store-to-load forward operation based on a second store instruction that is not retired. In some aspects the load/store unit is to verify the store-to-load forward operation in response to a load address of a load instruction matching a first store address of the first store instruction. In some aspects the load/store unit is to verify the store-to-load forward operation in response to the load address matching a second store address of the second store instruction. In some aspects the processor includes a queue comprising an entry to store information representing the first store instruction; and the load/store unit is to indicate the entry is invalid in response to the retire stage retiring the first store instruction, and is to determine if an error occurred in the store-to-load forward operation when the entry is indicated as invalid. In some aspects the load/store unit is to replace the information representing the first store instruction at the entry of the queue with information representing a second store instruction in response to determining the entry is indicated as invalid. In some aspects the processor includes a store-to-load forward prediction module to provide predictions of store-to-load forward operations, the scheduler to perform the store-to-load forward operations based on the predictions. In some aspects the load/store unit is to determine if an error occurred in the store-to-load forward operation by: determining that data of the first store instruction was forwarded to a load instruction; determining that a first address of the first store instruction matches a load address of the load instruction; determining that a second address of a second store instruction matches the load address; and determining that an error occurred in the store-to-load forward operation in response to determining that the second store instruction is between the first store instruction and the load instruction in a program order.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope disclosed embodiments as set forth in the claims below. Accordingly, the specification and figures are to be regarded in an illustrative rather than a restrictive sense, and all such modifications are intended to be included within the scope disclosed embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method to determine at a processor if a store-to-load forward operation has provided correct data to a load instruction, the method comprising:
   storing first information representing a first store instruction at a queue;
   performing the store-to-load forward operation by forwarding data of the first store instruction to the load instruction;
   retiring the first store instruction after performing the store-to-load forward operation;
   continuing to maintain the first information at the queue after performing the store-to-load forward information and the first store instruction has retired; and
   confirming, after the first store instruction has retired, the store-to-load forward operation based on the first information stored at the queue, wherein confirming comprises determining whether correct data was provided to the load instruction by the store-to-load forward operation.

2. The method of claim 1, further comprising:
   storing second information representing a second store instruction at the queue; and
   wherein confirming the store-to-load forward operation comprises confirming the store-to-load forward operation based on the second information while the second information indicates the second store instruction is not retired.

3. The method of claim 2, wherein confirming the store-to-load forward operation comprises verifying the store-to-load forward operation in response to determining a load address of the load instruction matches a first store address of the first store instruction stored at the queue.

4. The method of claim 3, wherein confirming the store-to-load forward operation comprises verifying the store-to-load forward operation in response to determining a load address of the load instruction matches a second store address of the second store instruction stored at the queue.

5. The method of claim 1, further comprising:
   indicating the first information is invalid in response to retiring the first store instruction; and
   wherein confirming the store-to-load forward operation comprises confirming the store-to-load forward operation after the first information is indicated as invalid.

6. The method of claim 5, further comprising:
   replacing the first information at the queue with information representing a second store instruction in response to determining the first information is indicated as invalid.

7. The method of claim 1, further comprising:
   performing the store-to-load forward operation in response to a prediction that the load instruction is a dependent load instruction.

8. The method of claim 1, wherein confirming the store-to-load forward operation comprises:
   determining that data of the first store instruction was forwarded to the load instruction;
   determining that a first address of the first store instruction matches a load address of the load instruction;
   determining that a second address of a second store instruction matches the load address; and
   determining that the store-to-load forward operation was incorrect in response to determining that the second store instruction is between the first store instruction and the load instruction in a program order.

9. The method of claim 8, further comprising resyncing an instruction pipeline in response to determining the store-to-load forward operation was incorrect.

10. A method comprising:
    determining that incorrect data was forwarded from a first store instruction to a load instruction by comparing an address of the load instruction to a plurality of store addresses stored at a corresponding plurality of store queue entries of a store queue, a first entry of the plurality of store queue entries indicated as storing invalid data and having a store address to which the address of the load instruction is compared; and
    performing a resynchronization operation at an instruction pipeline in response to the determination that incorrect data was forwarded from the first store instruction to the load instruction.

11. The method of claim 10, further comprising:
indicating the first entry stores invalid data in response to retiring a second store instruction associated with the first entry.

12. The method of claim 10, further comprising:
replacing data at the first entry of the plurality of store queue entries with data associated with a second store instruction in response to determining the first entry is indicated as invalid.

13. A processor comprising:
a retire stage to retire store instructions from an instruction pipeline;
a plurality of registers comprising a first register and a second register;
a scheduler to perform a store-to-load forward operation by transferring data at the first register to the second register; and
a load/store unit to determine if an error occurred in the store-to-load forward operation based on a retired first store instruction.

14. The processor of claim 13, wherein the load/store unit is to determine if an error occurred in the store-to-load forward operation based on a second store instruction that is not retired.

15. The processor of claim 14, wherein the load/store unit is to verify the store-to-load forward operation in response to a load address of a load instruction matching a first store address of the retired first store instruction.

16. The processor of claim 15, wherein the load/store unit is to verify the store-to-load forward operation in response to the load address matching a second store address of the second store instruction.

17. The processor of claim 13, further comprising:
a queue comprising an entry to store information representing the retired first store instruction; and
wherein the load/store unit is to indicate the entry is invalid in response to the retire stage retiring the retired first store instruction, and is to determine if an error occurred in the store-to-load forward operation when the entry is indicated as invalid.

18. The processor of claim 17, wherein the load/store unit is to replace the information representing the retired first store instruction at the entry of the queue with information representing a second store instruction in response to determining the entry is indicated as invalid.

19. The processor of claim 13, further comprising:
a store-to-load forward prediction module to provide predictions of store-to-load forward operations, the scheduler to perform the store-to-load forward operations based on the predictions.

20. The processor of claim 13, wherein the load/store unit is to determine if an error occurred in the store-to-load forward operation by:
determining that data of the first store instruction was forwarded to a load instruction;
determining that a first address of the first store instruction matches a load address of the load instruction;
determining that a second address of a second store instruction matches the load address; and
determining that an error occurred in the store-to-load forward operation in response to determining that the second store instruction is between the first store instruction and the load instruction in a program order.

21. A non-transitory computer readable storage medium storing code to adapt at least one computer system to perform a portion of a process to fabricate at least part of a processor comprising:
a retire stage to retire store instructions from an instruction pipeline;
a plurality of registers comprising a first register and a second register;
a scheduler to perform a store-to-load forward operation by transferring data at the first register to the second register; and
a load/store unit to determine if an error occurred in the store-to-load forward operation based on a retired first store instruction.

22. The computer readable medium of claim 21, wherein the load/store unit is to determine if an error occurred in the store-to-load forward operation based on an unretired second store instruction.

23. The computer readable medium of claim 22, wherein the load/store unit is to determine if an error occurred in the store-to-load forward operation by comparing a load address of a load instruction to a first store address of the retired first store instruction.

24. The computer readable medium of claim 23, wherein the processor further comprises:
a queue comprising an entry to store information representing the retired first store instruction; and
wherein the load/store unit is to indicate the entry is invalid in response to the retire stage retiring the retired first store instruction, and is to determine if an error occurred in the store-to-load forward operation when the entry is indicated as invalid.

25. The computer readable medium of claim 24, wherein the load/store unit is to replace information representing the retired first store instruction at the entry of the queue with information representing a second store instruction in response to determining the entry is indicated as invalid.

* * * * *